US008400627B2

(12) United States Patent
Jak et al.

(10) Patent No.: US 8,400,627 B2
(45) Date of Patent: Mar. 19, 2013

(54) PHOTO-DETECTOR AND METHOD OF MEASURING LIGHT

(75) Inventors: Martin Jacobus Johan Jak, Eindhoven (NL); Theodorus Johannes Petrus Van Den Biggelaar, Eindhoven (NL); Eduard Johannes Meijer, Eindhoven (NL); Eugene Timmering, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 225 days.

(21) Appl. No.: 12/922,721

(22) PCT Filed: Mar. 11, 2009

(86) PCT No.: PCT/IB2009/051013
§ 371 (c)(1),
(2), (4) Date: Sep. 15, 2010

(87) PCT Pub. No.: WO2009/115945
PCT Pub. Date: Sep. 24, 2009

(65) Prior Publication Data
US 2011/0007306 A1    Jan. 13, 2011

(30) Foreign Application Priority Data
Mar. 20, 2008  (EP) ..................... 08153115

(51) Int. Cl.
*G01J 1/42* (2006.01)
(52) U.S. Cl. ...................... 356/225; 356/218
(58) Field of Classification Search .......... 356/213–225
See application file for complete search history.

(56) References Cited

U.S. PATENT DOCUMENTS

| 4,783,593 A | * 11/1988 | Noble ............................ 250/352 |
| 5,258,618 A | 11/1993 | Noble |
| 5,281,797 A | * 1/1994 | Tatsuno et al. ............. 250/201.5 |

(Continued)

FOREIGN PATENT DOCUMENTS

| EP | 0132342 A2 | 1/1985 |
| EP | 0355219 A1 | 2/1990 |
| EP | 1494047 A1 | 1/2005 |

OTHER PUBLICATIONS

Veeraraghavan et al: "Non-Refractive Modulators for Encoding and Capturing Scene Appearance and Depth"; IEEE Conference on Computer Vision and Pattern Recognition, CVPR 2008, pp. 1-8.
Zomet et al: "Lensless Imaging With a Controllable Aperture"; Proceedings of the 2006 IEEE Computer Society Conference on Computer Vision and Pattern Recognition 2006 (CVPR'06), 8 Page Document.

*Primary Examiner* — Michael P Stafira
(74) *Attorney, Agent, or Firm* — Mark Beloborodov; Kenneth Springer

(57) ABSTRACT

Proposed is a light sensor (1), comprising at least one wavelength selective photo-detector (10), a lens (20) and an aperture (30). The wavelength selective photo-detector allows detecting light within a predefined wavelength range falling on the sensor. The lens project light on the photo-detector and the aperture defines a field of view of the light sensor. The photo-detector (10), the lens (20), and the aperture (30) are arranged in a telecentric configuration. Advantageously, this allows light to impinge on the wavelength selective photo-detector within a predefined range of angles irrespective of the direction of the light incident on the aperture, thus removing the angle dependent response of the wavelength selective photo-detector.

15 Claims, 4 Drawing Sheets

U.S. PATENT DOCUMENTS

| | | |
|---|---|---|
| 6,911,637 B1 | 6/2005 | Vorontsov et al. |
| 7,095,009 B2 | 8/2006 | Harada et al. |
| 7,280,205 B2 | 10/2007 | Bouzid et al. |
| 7,292,341 B2 | 11/2007 | Brill et al. |
| 2005/0052649 A1 | 3/2005 | Tsujita |
| 2005/0260741 A1 * | 11/2005 | Albertson et al. ......... 435/287.2 |
| 2007/0081158 A1 | 4/2007 | Brady et al. |
| 2008/0106732 A1 | 5/2008 | Brady et al. |

* cited by examiner

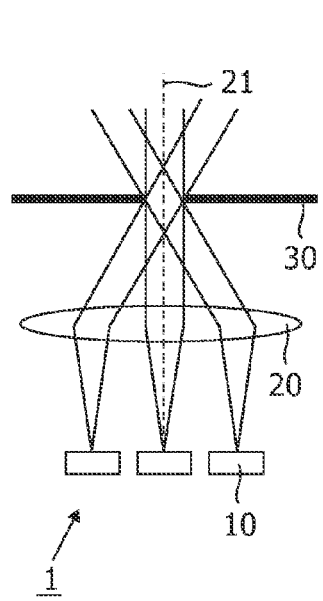 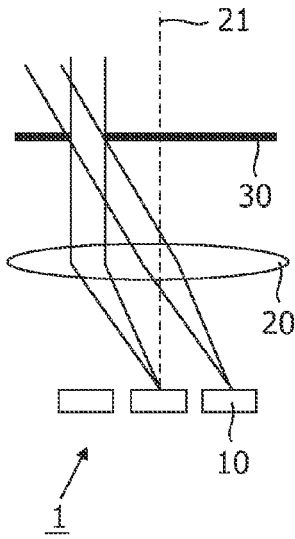 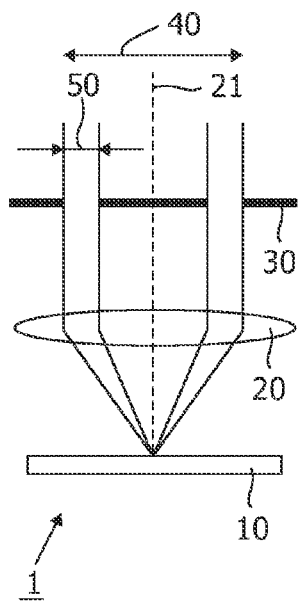
FIG. 3A  FIG. 3B  FIG. 3C
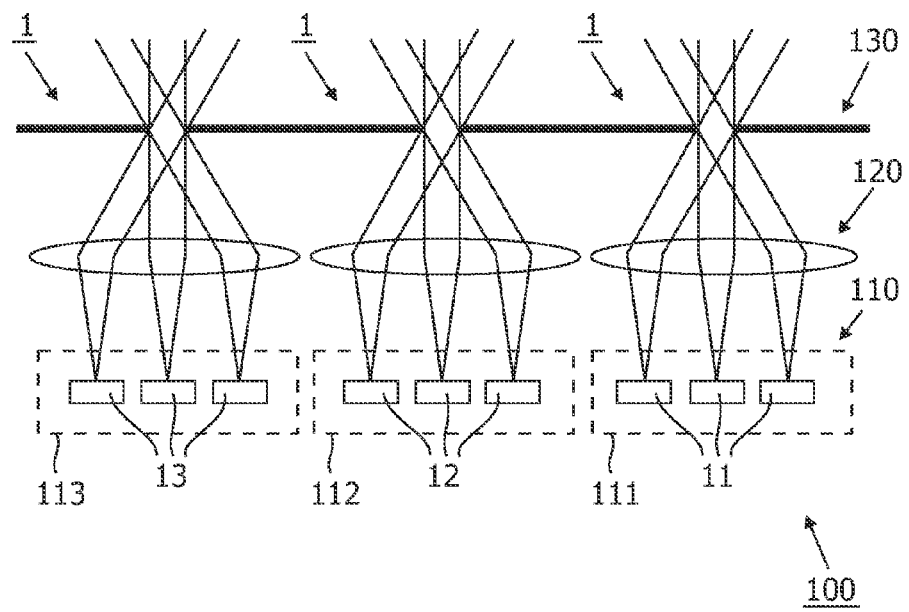
FIG. 4

PHOTO-DETECTOR AND METHOD OF MEASURING LIGHT

FIELD OF THE INVENTION

The invention relates to a light sensor comprising at least one wavelength selective photo-detector for detecting light within a predefined wavelength range falling on the sensor, a lens for projecting the light onto the photo-detector, and an aperture for defining the field of view of the sensor. Furthermore, the invention relates to a method of measuring light. Such light sensors are used in particular in the detection and control of illumination patterns.

BACKGROUND OF THE INVENTION

The control of single coloured light sources and the tuning of the light atmosphere inside a room created by several light sources require a proper measurement of illumination and colour patterns. This becomes especially important in the case of light emitting diodes (LEDs) as they tend to change their output spectra over time. Moreover, their output spectra are a function of the drive level and differ from one LED to the other. Consequently, correct control requires an accurate measure of the light output spectrum. Light sensors based on an array of photo-detectors with narrow band colour filters enable measuring the output spectrum. Every photo-detector measures a small part of the spectrum enabling the reconstruction of the entire spectrum.

Interference filters, for example based on a stack of dielectric layers, and so called Fabry-Perot etalons constitute the most common type of narrow band colour filters. Advantageously, these filters can have a very narrow spectral response. The central wavelength of the filter, however, depends strongly on the angle of incidence of the light. Consequently, the spectral response of a light sensor will differ for light rays impinging on it from different directions. This clearly constitutes a drawback, preventing an accurate measurement of the light spectrum. In addition, the narrow band filters transmit only a small amount of the spectrum, diminishing the sensitivity of the photo-sensor. Moreover, determining the spectrum with a high resolution requires a large amount of these filters.

SUMMARY OF THE INVENTION

It is an objective of the invention to provide a light sensor of the kind set forth alleviating at least one of these problems. This object is achieved with the light sensor according to the invention as defined in claim 1. A light sensor comprising at least one wavelength selective photo-detector for detecting light within a predefined wavelength range falling on the sensor, a lens for projecting the light onto the photo-detector, an aperture for defining the field of view of the sensor, characterised in that the photo-detector, the lens, and the aperture are arranged in a telecentric configuration. In such a configuration both the photo-detector and the aperture are positioned at a distance from the lens equal to its focal length. In other words, the invention is characterized in that the lens has a first and second focal plane, and the photo-detector and the aperture are arranged in the first and second focal plane, respectively. Advantageously, the light will impinge on the wavelength selective photo-detector within a predefined range of angles (f.i. at near normal incidence) irrespective of the direction of the light incident on the aperture, thus removing the angle dependent response. Moreover, since the aperture and the lens can be much larger than the wavelength selective photo-detector more light can be collected, thus improving the sensitivity.

In an embodiment, the aperture is arranged to be controllable in size, shape or position. Advantageously, this allows controlling the range of angles with which the light impinges on the photo-detector, thus enabling control of the spectral response of the wavelength selective photo-detector and light sensor. As a further advantage, controlling the spectral response allows reducing the number of photo-detectors while maintaining high resolution capabilities. This allows making the sensor simpler and smaller.

In an embodiment the aperture comprises an electro-optical light modulator. In an embodiment the electro-optical light modulator comprises a liquid crystal cell, an electro-wetting cell, or an electrophoresis cell. Advantageously, this allows implementing a dynamic and controllable aperture system which enables spectral scanning capabilities.

In an embodiment the aperture is arranged to be ring-shaped. Advantageously, the ring diameter defines the peak transmission wavelength of the light sensor. Moreover, the ring width defines the width of the spectral response of the light sensor.

In an embodiment the wavelength selective photo-detector comprises an interference filter or Fabry-Perot etalon. In an embodiment the lens has an optical axis and the position of the aperture is arranged to be controllable in a plane perpendicular to the optical axis to allow scanning the spectrum of the light falling on the sensor. Advantageously, this allows determining both spectral and angular information of the light falling on the light sensor.

According to a second aspect the invention provides a method to measure light comprising the steps (i) providing at least one wavelength selective photo-detector for detecting light within a predefined wavelength range, (ii) providing a lens for projecting the light onto the photo-detector, and (iii) providing an aperture for defining a field of view of the photo-detector, characterised by positioning the photo-detector, the lens, and the aperture in a telecentric configuration.

In an embodiment, the method further comprises the step adjusting shape, size or position of the aperture in a plane perpendicular to the optical axis of the lens to allow scanning the spectrum of the light falling on the sensor.

These and other aspects of the invention will be apparent from and elucidated with reference to the embodiments described hereinafter.

BRIEF DESCRIPTION OF THE DRAWINGS

Further details, features and advantages of the invention are disclosed in the following description of exemplary and preferred embodiments in connection with the drawings.

DETAILED DESCRIPTION OF THE EMBODIMENTS

Figure 1:
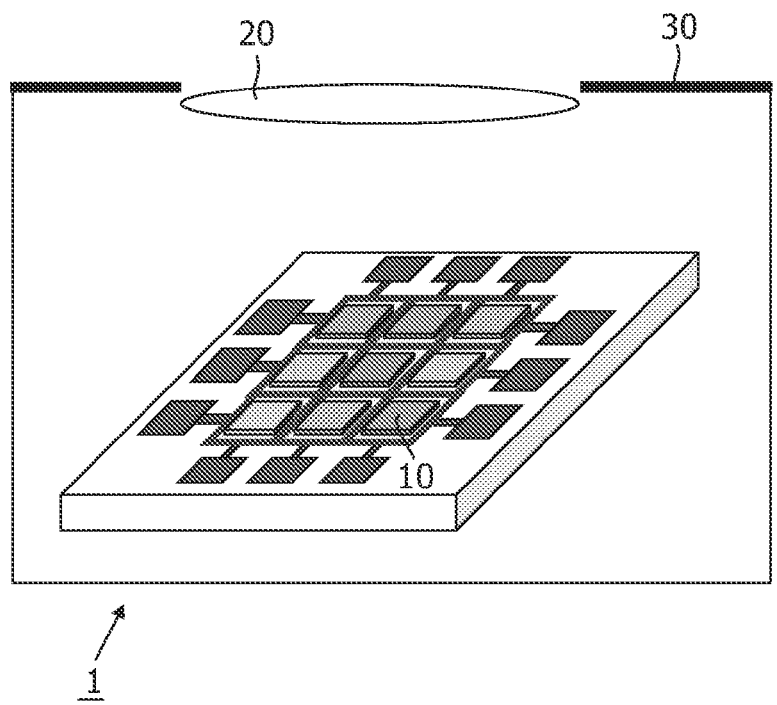
FIG. 1 schematically shows a prior art light sensor with an array of wavelength selective photo-detectors FIG. 2 schematically shows an embodiment of a light sensor according to the invention FIG. 3 schematically shows another embodiment of a light sensor according to the invention FIG. 4 schematically shows a third embodiment of a light sensor according to the invention FIG. 5 schematically shows a fourth embodiment of a light sensor according to the invention FIG. 6 schemetically shows two embodiments of an aperture useable in a light sensor according to the invention.

FIG. 1 schematically shows a light sensor 1 with an array of wavelength selective photo-detectors 10. The light sensor further more comprises a lens 20 for projecting the light onto the photo-detectors 10, and an aperture 30 for defining the field of view of the sensor. The light sensor 1 further comprises appropriate electronics and a user interface (not shown) for further processing and presentation of the detected light to a user.

The wavelength selective photo-detectors 10 may be made of a diode or charge coupled device covered by an interference filter or Fabry-Perot etalon. The varying transmission function (i.e. the wavelength selectivity) of these filters is caused by interference between the multiple reflections of light between two (or more) reflecting surfaces. Constructive interference occurs if the transmitted beams are in phase. This corresponds to a high-transmission peak of the filter. If the transmitted beams are out-of-phase destructive interference occurs, corresponding to a transmission minimum. Whether the multiply-reflected beams are in-phase or not depends on the wavelength ($\lambda$) of the light, the angle ($\theta$) the light travels through the filter, the thickness (t) of the filter(layers) and the refractive index (n) of the material between the reflecting surfaces. Maximum transmission occurs when the optical path length difference ($2nt \cos \theta$) between each transmitted beam is an integer multiple of $\lambda$. The wavelength range over which a filter transmits can be made quite selective through control of its finesse. This allows the design of an array of photo-detectors 10 having a multitude of filters with different (layer)thicknesses. Such an array enables an accurate measurement of light spectrum falling on the sensor. The transmission relation above, however, clearly shows that the peak transmission wavelength shifts to the blue for increasing angle of incidence of the light. Hence, such a light sensor 1 will measure and determine different spectral ranges for light falling on the sensor at non-normal angles.

According to a first aspect of the invention, the wavelength selective photo-detector 10, the lens 20, and the aperture 30 are arranged in a telecentric configuration. In a telecentric configuration both the photo-detector 10 and the aperture 30 are positioned at a distance from the lens 20 equal to its focal length f (see FIGS. 2A&B). Positioning the aperture 30 in the focal plane of the lens 20 results in light rays refracted towards the optical axis 21 of the lens 20. Positioning the photo-detector 10 in the focal plane of the lens 20 results in light rays focussed on the photo-detector. Thus advantageously, light rays passing the aperture 30 impinge on the wavelength selective photo-detector 10 with angles within a cone around the normal to the photo-detector. As can be discerned from a comparison of FIGS. 2A and 2B, the size of the aperture 30 determines the width of the cone. Since the spectral response of the wavelength selective photo-detector 10 depends on the cone width, adjustment of the aperture width or size allows controlling the spectral sensitivity of the sensor 1. Advantageously, varying the aperture 30 width/size allows making a trade-off between the (intensity) sensitivity of the sensor and the spectral resolution.

Figure 7:
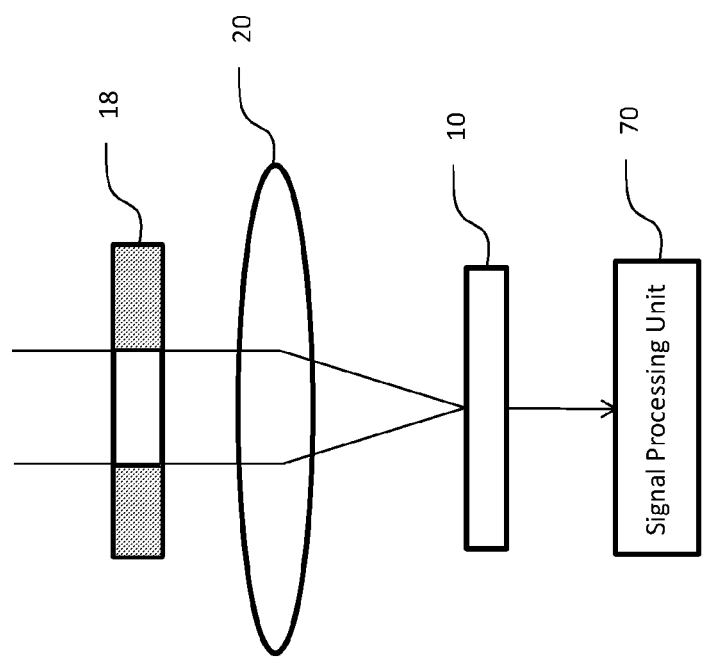
FIG. 7 illustrates an embodiment of a light sensor according to the invention

Varying not only the size of the aperture 30 but also the position of the aperture in the focal plane of the lens 20, allows an even larger control of the spectral response of the light sensor 1. For example, with a ring-shaped aperture 30 (see FIG. 3C), the ring diameter 40 sets the average angle (defining the peak transmission wavelength of the light sensor 1) with which the light impinges on the wavelength selective photo-detector 10, while the ring width 50 sets the width of the angular distribution (defining the width of the spectral response of the light sensor 1) with which the light impinges. Thus, scanning the ring diameter 40 equates to making a spectral scan over a predetermined wavelength range. Advantageously, this allows reducing the photo-detector array size (i.e. the number of photo-detector filter combinations) to in principle a single detector. In an embodiment, an electro-optical light modulator 18 (see FIG. 7) constitutes such a dynamic and controllable aperture system. As an example, the electro-optical modulator 18 could be a liquid crystal cell, an electro-wetting cell, an in-plane electrophoresis cell moving ink particles in the focal plane under the influence of a control voltage, or even a mechanically operated aperture.

As FIGS. 3A&B show, (i) the position of the aperture 30 in a plane perpendicular to the optical axis 21 of lens 20 directly relates to the average angle with which the light impinges on the array of wavelength selective photo-detectors 10 and (ii) the position of the photo-detector 10 in the array directly relates to the direction of light incident on the aperture 30. Hence, repositioning or scanning the aperture in/through the focal plane of the lens 20 allows determining both spectral and angular information of the light falling on the light sensor 1.

FIG. 4 schematically shows in a further embodiment a light sensor 100 essentially comprising an array of light sensors 1 according to the invention. Thus the light sensor 100 comprises an array of wavelength selective photo-detectors 110, an array of lenses 120 and an array of apertures 130, where these three arrays are arranged in a telecentric configuration. Arranging the array of wavelength dependent photo-detectors 110 in sub-arrays 111, 112, 113 allows assigning the sub-arrays to a single lens and a single aperture. The sub-arrays comprise photo-detectors all having the same spectral response. Thus, for instance, sub-array 111 comprises wavelength selective photo-detectors 11 having a response mainly in the red part of the visible spectrum. Similarly, photo-detectors 12 in sub-array 112 have their spectral response mainly in the green part, while the photo-detectors 13 in sub-array 113 have theirs in the blue part of the visible spectrum. Clearly, no specific limit exists on the number of sub-arrays and the (corresponding) number of specific spectral responses of the wavelength selective photo-detectors. Arranging the photo-detectors in the sub-arrays accordingly, beneficially allows determining the angular distribution of the light incident on the aperture array 130 from the position of the light incident on the photo-detectors 11, 12, 13 in the sub-arrays 111, 112, 113.

Figure 5:
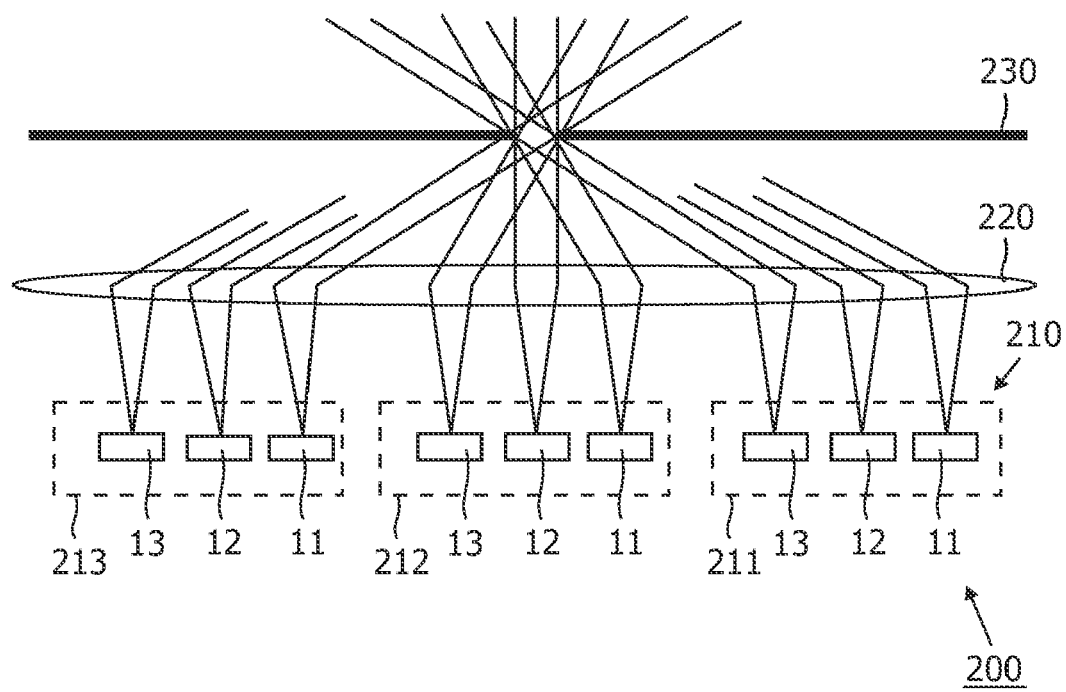

In yet another embodiment, the light sensor 200 shown in FIG. 5 comprises an array of wavelength selective photo-detectors 210, a lens 220 and an aperture 230, again arranged in a telecentric configuration. The array of photo-detectors 210 is arranged in sub-arrays 211, 212, 213 each comprising wavelength selective photo-detectors 11, 12, 13 having their main spectral response in different parts of the visible spectrum. The wavelength selective photo-detectors 11, 12, 13 in each sub-array 211, 212, 213 may, for instance, be arranged in a Bayer pattern (i.e. one 'red', one 'blue', two 'green' pixels). Thus, similarly to a normal camera system, the 'red-green-blue' pixel pattern repeats itself multiple times. Again the number of photo-detectors with different spectral responses is not limited, nor do these spectral responses need to be located in the red, green and blue part of the visible spectrum, The number and spectral location is simply a factor giving design freedom to the person skilled in the art. Advantageously, this embodiment allows interpolating the signals from the various colour filters to obtain full resolution angular and spectral information. This embodiment has the main advantage that only one lens and aperture are needed.

Figures 2A, 2B:
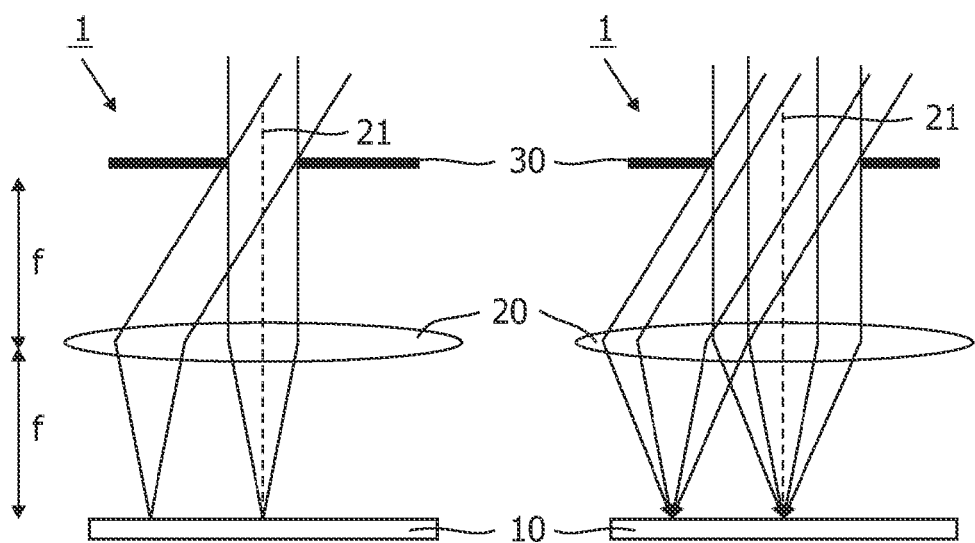
Figures 6A, 6B:
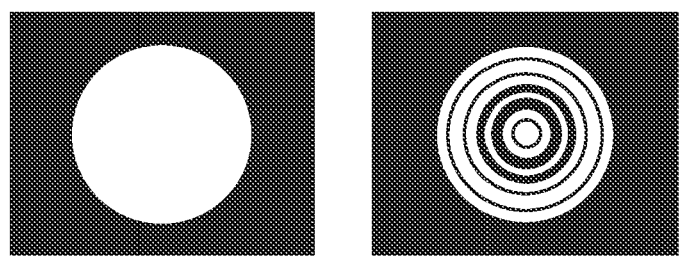

As discussed in conjunction with the embodiment in FIG.2A&B, the size of the variable aperture controls the angle of incidence (or more precisely the width of the angular distribution) of the light on photo-detector 10, and hence the width of the spectral response can be tuned. Consequently, in controlling the aperture size a trade-off is made: a large aperture provides a lot of light, but also a wide angular and hence wide spectral distribution, while a small aperture gives low transmission (and thus noise), but good resolution. Effectively, the resulting power distribution on the photo-detector plane is a convolution of the spectral power distribution and the aperture shape. In an embodiment, instead of a single (uncoded) the aperture 30 (FIG. 6A), the light sensor 1 comprises a coded ring shaped aperture (FIG. 6B). Advantageously, the fourier transform of the coded aperture (spatial frequency response of the aperture) is changed in a favorable way, such that de-convolution of the spectrum becomes much easier: a convolution in real space is most easily calculated in frequency / fourier space, since a convolution in real space is a simple multiplication in fourier space. The fourier transform of a 1-dimensional block shaped slit transmission function and a 2-dimentional circular aperture is the sinc function and Airy function, respectively. The measured spectrum is a convolution of the real spectrum with the transmission function of the slit or aperture. In fourier space this means that the fourier transform of the real spectrum is multiplied with the sinc function or Airy function. In order to recover the real spectrum from the measured spectrum (a de-convolution) one can divide the fourier transform of the measured spectrum by the sinc function or Airy function. As the sinc and Airy functions become very small, or even zero at certain frequencies, these frequencies would need to be amplified very strongly (division by zero). Hence perfect restoration is not possible. By using a (pseudo-random) coded slit or aperture the fourier transform is much more favorable (i.e. no small values) for de-convolution afterwards, while still transmitting a lot of light. For this purpose the light sensor comprises a signal processing unit 70 (see FIG. 7) that performs this de-convolution. Moreover, implementation of the coded ring shape aperture increases the transmission and hence the sensitivity of light sensor 1 without decreasing the spectral resolution or increasing its size.

Although the invention has been elucidated with reference to the embodiments described above, it will be evident that alternative embodiments may be used to achieve the same objective. The scope of the invention is therefore not limited to the embodiments described above. Accordingly, the spirit and scope of the invention is to be limited only by the claims and their equivalents.

The invention claimed is:
1. A light sensor, comprising:
   at least one wavelength selective photo-detector for detecting light within a predefined wavelength range falling on the sensor,
   a lens for projecting the light onto the photo-detector, the lens having a first and second focal plane;
   an aperture for defining the field of view of the sensor and having an electro-optical modulator disposed therein, the photo-detector and the aperture being arranged in the first and second focal plane, respectively, wherein at least one of a size, shape, and position of the aperture is controllable via the electro-optical modulator, the lens has a first and second focal plane, and the photo-detector and the aperture are arranged in the first and second focal plane, respectively.

2. The light sensor of claim 1, wherein the electro-optical light modulator comprises a liquid crystal cell.

3. The light sensor of claim 1, wherein the aperture is arranged to be ring-shaped, defined by an inner perimeter of the aperture and an outer perimeter surrounding the aperture.

4. The light sensor of claim 1, wherein the aperture is arranged to comprise a coded ring-shaped aperture and wherein the wavelength selective photo-detector comprises an interference filter or Fabry-Perot etalon.

5. The light sensor of claim 1, wherein the wavelength selective photo-detector comprises an interference filter or Fabry-Perot etalon.

6. The light sensor of claim 1, wherein the lens has an optical axis and the position of the aperture is arranged to be controllable in a plane perpendicular to the optical axis to scan the spectrum of the light falling on the light sensor.

7. The light sensor of claim 1, wherein the at least one wavelength selective photo-detector comprises an array of wavelength selective photo-detectors.

8. The light sensor of claim 7, wherein a position of the light incident on the array is determined by an angular distribution of the light incident on the aperture.

9. The light sensor of claim 7, wherein the wavelength selective photo-detectors of the array all have a same spectral response.

10. The light sensor of claim 7, wherein the wavelength selective photo-detectors of the array have different spectral responses from each other.

11. The light sensor of claim 10, wherein a first one of the wavelength selective photo-detectors has a main spectral response in a red part of the visible spectrum, a second one of the wavelength selective photo-detectors has a main spectral response in a blue part of the visible spectrum, and a third one of the wavelength selective photo-detectors has a main spectral response in a green part of the visible spectrum.

12. The light sensor of claim 1, wherein the electro-optical light modulator comprises an electro-wetting cell.

13. The light sensor of claim 1, wherein the electro-optical light modulator comprises an electrophoresis cell.

14. The light sensor of claim 1, further comprising a signal processing unit configured to recover a real spectrum of the light from a measured spectrum of the light detected by the at least one wavelength selective photo-detector, by deconvolving the measured spectrum with a transmission function of the aperture.

15. The light sensor of claim 1, wherein deconvolving the measured spectrum with a transmission function of the aperture comprises dividing a Fourier transform of the measured spectrum by a Fourier transform of the transmission function of the aperture.

* * * * *